(12) United States Patent
Bogen et al.

(10) Patent No.: US 8,057,836 B2
(45) Date of Patent: Nov. 15, 2011

(54) SPRAYABLE COOKING COMPOSITIONS FOR HIGH TEMPERATURE USE

(75) Inventors: Harry Bogen, Danville, IL (US); Asim Syed, Grand Rapids, MI (US)

(73) Assignee: ConAgra Foods RDM, Inc., Omaha, NE (US)

( * ) Notice: Subject to any disclaimer, the term of this patent is extended or adjusted under 35 U.S.C. 154(b) by 635 days.

(21) Appl. No.: 12/176,208

(22) Filed: Jul. 18, 2008

(65) Prior Publication Data
US 2009/0029015 A1 Jan. 29, 2009

Related U.S. Application Data

(60) Provisional application No. 60/961,352, filed on Jul. 20, 2007.

(51) Int. Cl.
*A23D 9/00* (2006.01)
(52) U.S. Cl. ........................ 426/601; 426/811
(58) Field of Classification Search .................... 426/601
See application file for complete search history.

(56) References Cited

U.S. PATENT DOCUMENTS

| 7,037,550 B2 * | 5/2006 | Liu et al. ........................ 426/609 |
| 7,078,069 B2 * | 7/2006 | Liu ............................... 426/609 |
| 7,320,809 B2 | 1/2008 | Friedman et al. ............. 426/541 |
| 2003/0068426 A1 | 4/2003 | Idris et al. ..................... 426/601 |
| 2005/0181110 A1 * | 8/2005 | Liu ............................... 426/609 |

FOREIGN PATENT DOCUMENTS

| EP | 0 836 805 B1 | 4/1998 |
| WO | WO 2004/105500 A2 | 12/2004 |

OTHER PUBLICATIONS

Swern, D. 1979. Bailey's Industrial Oil and Fat Products, vol. 1, 4$^{th}$ edition, John Wiley & Sons, New York, p. 358.*
King, C. nd Camire, M. 1989. JAOCS 66(2)192.*

\* cited by examiner

*Primary Examiner* — Carolyn Paden
(74) *Attorney, Agent, or Firm* — Advent; Ryan T. Grace (57) ABSTRACT

The application relates to a sprayable cooking composition having enhanced high heat performance. The cooking composition includes cottonseed oil, a crystal inhibitor, and a cookware release agent and does not polymerize at high cooking temperature, or exhibits reduced polymerization and/or browning at high cooking temperature.

17 Claims, 4 Drawing Sheets

FIG. 4

SPRAYABLE COOKING COMPOSITIONS FOR HIGH TEMPERATURE USE

BACKGROUND

Cooking spray products generally are comprised of vegetable oils. The vegetable oils may by fractionated or partially hydrogenated. Two of the more common vegetable oils to be used in cooking sprays are soybean oil and canola oil. However soybean and canola oils contain high levels of polyunsaturated fatty acids which make them susceptible to oxidation. Additionally, oils high in polyunsaturated fats have a tendency to polymerize at medium to high cooking temperatures, which results in polymerized film being deposited on skillets and pans.

Fractionated oils tend to have a lower rate of polymerization. Fractionated oils contain high levels of trans fatty acids and high levels of saturated fatty acids. However, trans fatty acids and saturated fatty acids are unhealthy. Additionally, while fractionated oils have a lower rate of polymerization, fractionated oils are frequently contaminated with hard fat fractions which causes clogging of the spray nozzle system. Sprayable cooking compositions that are low in trans fatty acids, non-hydrogenated, and suitable for use at high cooking temperatures are needed.

SUMMARY

The application is directed to a sprayable cooking composition having enhanced high heat performance. The cooking composition includes cottonseed oil, a crystal inhibitor, and a cookware release agent and does not polymerize at high cooking temperature, or exhibits reduced polymerization and/or browning at high cooking temperature. The cooking composition can include one or more preservatives, flavorings, foam inhibitor, water or other adjuvants, and/or colorants.

The cooking composition may include about 40% to about 60% linoleic acid by weight; about 15% to about 40% saturated fatty acid by weight; and about 1% or less trans fatty acid by weight. The cooking composition can include a fatty acid profile of about 1.0% myristic acid by weight, about 22% palmitic acid by weight, about 3.0% stearic acid by weight, about 19% oleic acid by weight, about 54% linoleic acid by weight, and about 1% or less linolenic acid by weight.

The application also relates to a method for making a cooking composition, including providing a first quantity of a plant derived oil, providing a second quantity of a crystal inhibitor, and blending the first quantity of plant derived oil and the second quantity of crystal inhibitor.

It is to be understood that both the foregoing general description and the following detailed description is explanatory only and not restrictive. The accompanying drawings, which are incorporated in and constitute a part of the specification, illustrate the cooking composition and the method for making the cooking composition and together with the general description, serve to explain the principles of the cooking composition and method for making the cooking composition.

BRIEF DESCRIPTION OF THE DRAWINGS

Numerous advantages may be better understood by those skilled in the art by reference to the accompanying figures in which.

DETAILED DESCRIPTION

Reference will now be made in detail to the cooking composition and method for making the cooking composition which are illustrated in the accompanying drawings.

Figure 1:
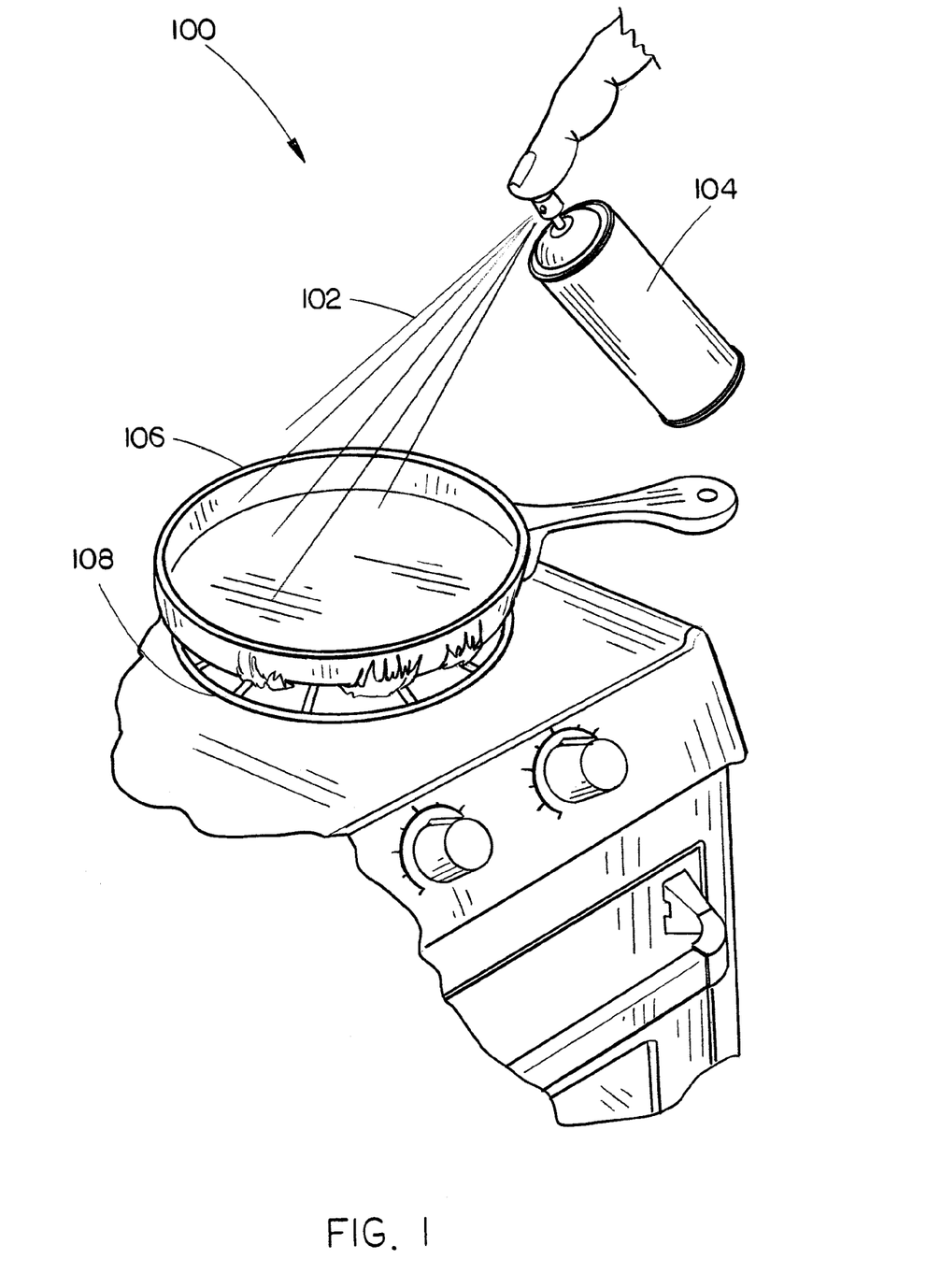
FIG. 1 depicts an aerosol based cooking composition being applied to a skillet.
Figure 2:
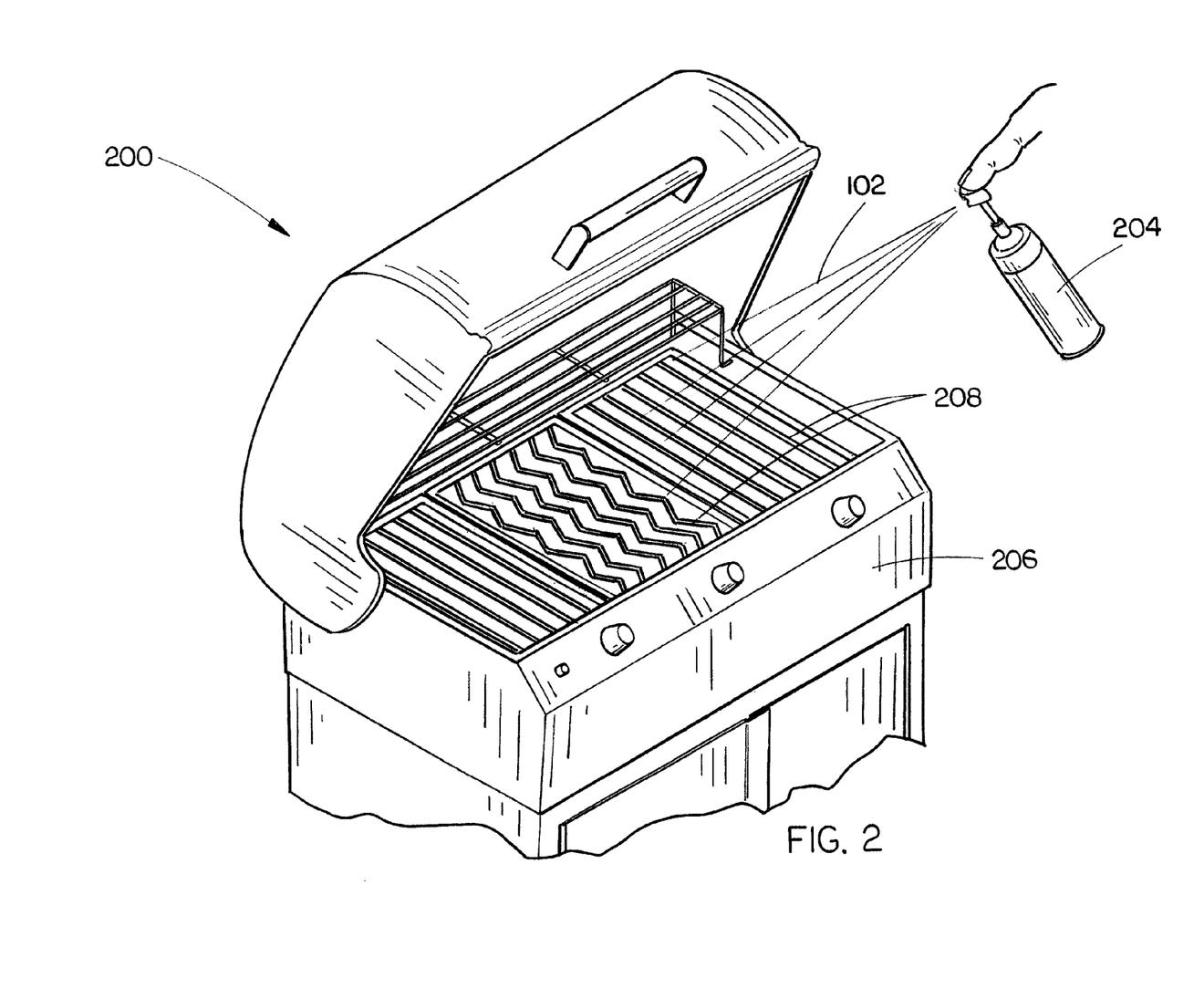
FIG. 2 depicts a non-aerosol based cooking composition being applied to a grill.
Figure 3:
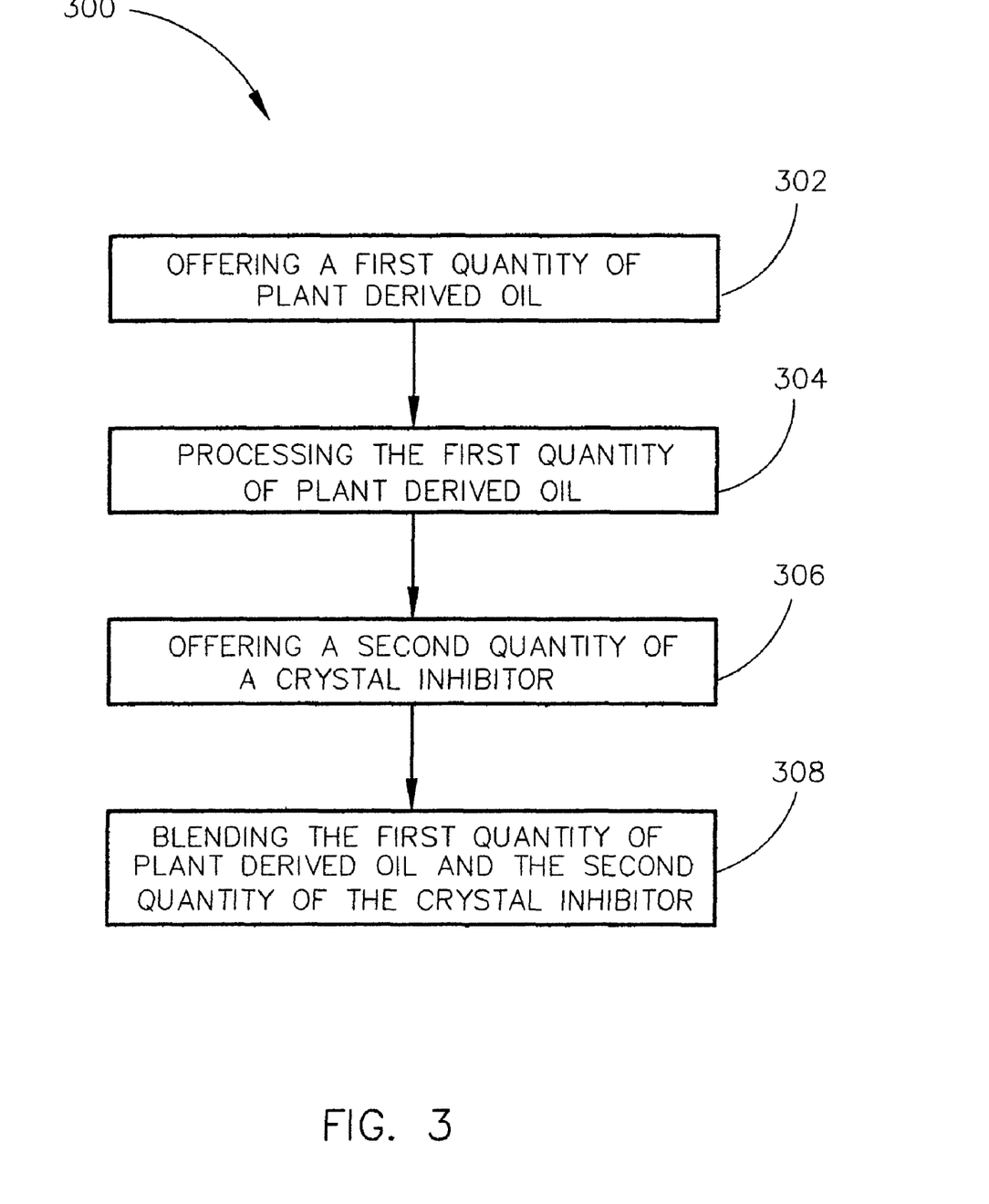
FIG. 3 depicts a method for making a cooking composition.

Referring generally to FIGS. 1-3, a cooking composition 102 and a method for making a cooking composition 300 is described. The cooking composition 102 includes cottonseed oil, a crystal inhibitor, and a cookware release agent and has enhanced high heat performance. For example, the cooking composition 102 exhibits enhanced high heat performance compared to a canola based cooking composition having a comparable formulation. The cooking spray composition of the disclosure generally is transparent or translucent and substantially free of foam.

The amount of cottonseed oil and crystal inhibitor of a cooking composition of the disclosure can be varied to provide a cooking composition with desirable cooking characteristics. Desirable cooking and performance characteristics include low rates of oil polymerization at medium and high cooking temperatures, reduced browning at medium and high cooking temperatures, desirable flavor, desirable lubricant properties, very low rate of clogging of the body, stem, and/or actuator of a spraying apparatus, and the like. The cooking composition of the disclosure provides a non-stick or low friction surface so that food items can be cooked at high temperatures on a surface coated with the composition, such as a pan or grilling surface, and easily removed therefrom. The cooking composition of the disclosures can be dispensed from an aerosol or non-aerosol container onto, for example, cookware surfaces, grilling surfaces, or utensils. The rate of clogging of the body, stem, and/or actuator of a spraying apparatus used to dispense cooking composition 102 onto the cookware surfaces is very low. In some examples of the disclosure, the rate of clogging of the body, stem, and/or actuator of a spraying apparatus by cooking composition 102 is less that 0.2%.

The cooking composition 102 preferably does not polymerize at high cooking temperatures and durations, or exhibits reduced polymerization and/or browning at high cooking temperatures and durations. For example, the cooking composition 102 is suitable to be applied to a frying pan, skillet, griddle, grilling grate, or utensils used to cook food items at about 350° F. to about 650° F. up to about 60 minutes. In an example, cooking composition 102 does not polymerize, or exhibits reduced polymerization and/or browning when heated to about 350° F. to about 550° F. for about 5 to about 60 minutes, for about 5 minutes to about 50 minutes, for about 5 minutes to about 40 minutes, for about 5 minutes to about 35 minutes, for about 5 minutes to about 30 minutes, for about 5 minutes to about 25 minutes, for about 5 minutes to about 20 minutes, for about 5 minutes to about 15 minutes, or for about 5 minutes to about 10 minutes. In another example, cooking composition 102 does not polymerize, or exhibits reduced polymerization and/or browning when heated to about 400° F. to about 650° F. for about 5 to about 60 minutes, for about 5 minutes to about 50 minutes, for about 5 minutes to about 40 minutes, for about 5 minutes to about 35 minutes, for about 5 minutes to about 30 minutes, for about 5 minutes to about 25 minutes, for about 5 minutes to about 20 minutes, for about 5 minutes to about 15 minutes, or for about 5 minutes to about 10 minutes. In another example, cooking composition 102 does not polymerize or exhibits reduced polymerization and/or browning when heated to about 400° F. to about 550° F. for about 5 to about 60 minutes, for about 5 minutes to about 50 minutes, for about 5 minutes to about 40 minutes, for about 5 minutes to about 35 minutes, for about 5 minutes to about 30 minutes, for about 5 minutes to about 25 minutes, for about 5 minutes to about 20 minutes, for about 5 minutes to about 15 minutes, or for about 5 minutes to about 10 minutes. In yet another example, cooking composition 102 does not polymerize or exhibits reduced polymerization and/or browning when heated to about 400° F. to about 500° F. for about 5 to about 60 minutes, for about 5 minutes to about 50 minutes, for about 5 minutes to about 40 minutes, for about 5 minutes to about 35 minutes, for about 5 minutes to about 30 minutes, for about 5 minutes to about 25 minutes, for about 5 minutes to about 20 minutes, for about 5 minutes to about 15 minutes, or for about 5 minutes to about 10 minutes. In yet another example, cooking composition 102 does not polymerize or exhibits reduced polymerization and/or browning when heated to about 450° F. about 20 minutes. In yet another example, cooking composition 102 does not polymerize or exhibits reduced polymerization and/or browning when heated to about 500° F. for about 20 minutes. In yet another example, cooking composition 102 does not polymerize or exhibits reduced polymerization and/or browning when heated to about 550° F. for about 20 minutes.

The temperature at which the cooking composition 102 begins to crystallize may vary depending with the formulation of the cooking composition 102. In some cooking compositions of the disclosure, cooking composition 102 comprises a cloud point of about 38° F. to about 46° F. In some cooking compositions of the disclosure, cooking composition 102 comprises a melt point of about 50° F. to about 60° F.

The cottonseed oil of cooking composition 102 can be winterized, deodorized, and/or refined. Winterization is a process where cottonseed oil is chilled, thereby separating the oil into a large clear phase and a smaller cloudy phase made of higher melting point fats. The cloudy phase may be filtered from the clear "winterized" fraction. Removing the cloudy phase reduces the quantity of natural waxes found in the oil, which may result in less clogging of the body, stem, and/or actuator of spraying apparatus 104. Blending the oil with a crystal inhibitor as provided herein further reduces the potential for clogging of the body, stem, and/or actuator of spraying apparatus 104 and/or eliminates clogging of the body, stem, and/or actuator of spraying apparatus 104 by cooking composition 102. In some examples, the oil is winterized and blended with a crystal inhibitor.

Wintering the cottonseed oil also reduces the amount of linolenic acid, resulting in lower rates of polymerization during cooking at medium to high temperatures. When oil polymerizes during cooking it can leave an undesirable film on cooking utensils, such as skillets, pans, grills and baking sheets. Lower rates of oil polymerization during cooking will reduce the quantity of film left on cookware and cooking utensils and is particularly beneficial when using cooking techniques that require medium to high temperatures, such as frying, sauteing, grilling and baking. In some of the cooking compositions of the disclosure, the cooking composition 102 comprises 1% or less linolenic acid by weight.

Deodorization is a process where oil is injected with hot steam in a vacuum environment. The steam removes volatile compounds such as monoglycerides, pigments, free fatty acids, fatty oxidation products, and other undesirable organic compounds. Deodorized oil can have a bland neutral flavor with minimal flavor transfer to the food. Refined cotton seed oil is washed with alkaline water solutions to remove acidic compounds such as free fatty acids.

Examples of suitable cottonseed oils include, but are not limited to, cottonseed oil produced by Hybco USA, Hartsville Oil Mill, Southern Cotton Oil Co., National Cottonseed, Inc., Wesson, Delta Oil Mill, Planters Cotton Oil Mill, Inc., Rey Henley Farms Inc., Mid Georgia Processing Co. LLC, Oilseeds International Ltd., Bianca Rosa, Admiration Foods, PYCO Industries, Inc., ACH Food Companies, or Loders Croklaan, Wesson Crystal Clear Cottonseed Oil, FryMax Sun Classic Clear (ACH Food Companies), Mazola Cotton Supreme Clear, Mazola Zero Trans, Plainsman Cottonseed Oil (PYCO Industries, Inc.), or SansTrans DDC (Loders Croklaan). Preferably the cottonseed oil is non-hydrogenated.

The oil component of the cooking composition 102 constitutes by percentage the largest component by weight of the composition and serves as a vehicle for the cookware release agent and any other ingredients. Cooking composition 102 comprises about 70% to about 99% cottonseed oil by weight. As used herein, the terms "percent by weight" and "% by weight" used with reference to a particular component means the weight of that component in the composition divided by the total weight of the composition, including that of the particular component, with the result multiplied by 100. The total weight of the composition as used herein does not include the weight of a propellant, if any, in the composition unless specifically noted otherwise. For example, if cooking composition 102 is disclosed as including 10% propellant by weight, the weight percentage of the oil and any other ingredients disclosed herein are adjusted proportionally to account for inclusion of the propellant. If cooking composition 102 comprises 90% oil by weight without propellant, the composition comprises 81% oil by weight if the same composition comprises 10% propellant by weight.

The cooking composition 102 comprises about 70% to about 99%, about 71% to about 99%, about 72% to about 99%, about 73% to about 99%, about 74% to about 99%, about 75% to about 99%, about 76% to about 99%, about 77% to about 99%, about 78% to about 99%, about 79% to about 99%, about 80% to about 99%, about 81% to about 99%, about 82% to about 99%, about 83% to about 99%, about 84% to about 99%, about 85% to about 99%, about 86% to about 99%, about 87% to about 99%, about 88% to about 99%, about 89% to about 99%, about 90% to about 99%, about 91% to about 99, about 92% to about 99%, about 93% to about 99%, about 94% to about 99%, about 95% to about 99%, about 96% to about 99%, about 97% to about 99%, or about 98% to about 99% cottonseed oil by weight. In some of the cooking compositions, the cottonseed oil comprises about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% by weight of the composition.

The cottonseed oil may be blended with one or more other plant derived oils that provide low rates of polymerization at medium and high temperatures. Sources of plant derived oils may include soybeans, palm, olive, corn, sunflower, canola, safflower, grape seed, and the like. In some cooking compositions of the disclosure, the oil comprises about 70% or more cottonseed oil by weight and about 30% or less of another plant derived oil by weight, 71% or more cottonseed oil by weight and about 29% or less of another plant derived oil by weight, 72% or more cottonseed oil by weight and about 28% or less of another plant derived oil by weight, 73% or more cottonseed oil by weight and about 27% or less of another plant derived oil by weight, 74% or more cottonseed oil by weight and about 26% or less of another plant derived oil by weight, 75% or more cottonseed oil by weight and about 25% or less of another plant derived oil by weight, 76% or more cottonseed oil by weight and about 24% or less of another plant derived oil by weight, 77% or more cottonseed oil by weight and about 23% or less of another plant derived oil by weight, 78% or more cottonseed oil by weight and about 22% or less of another plant derived oil by weight, 79% or more cottonseed oil by weight and about 21% or less of another plant derived oil by weight, 80% or more cottonseed oil by weight and about 20% or less of another plant derived oil by weight, 81% or more cottonseed oil by weight and about 19% or less of another plant derived oil by weight, 82% or more cottonseed oil by weight and about 18% or less of another plant derived oil by weight, 83% or more cottonseed oil by weight and about 17% or less of another plant derived oil by weight, 84% or more cottonseed oil by weight and about 16% or less of another plant derived oil by weight, 85% or more cottonseed oil by weight and about 15% or less of another plant derived oil by weight, 86% or more cottonseed oil by weight and about 14% or less of another plant derived oil by weight, 87% or more cottonseed oil by weight and about 13% or less of another plant derived oil by weight, 88% or more cottonseed oil by weight and about 12% or less of another plant derived oil by weight, 89% or more cottonseed oil by weight and about 11% or less of another plant derived oil by weight, 90% or more cottonseed oil by weight and about 10% or less of another plant derived oil by weight, 91% or more cottonseed oil by weight and about 9% or less of another plant derived oil by weight, 92% or more cottonseed oil by weight and about 8% or less of another plant derived oil by weight, 93% or more cottonseed oil by weight and about 7% or less of another plant derived oil by weight, 94% or more cottonseed oil by weight and about 6% or less of another plant derived oil by weight, 95% or more cottonseed oil by weight and about 5% or less of another plant derived oil by weight, 96% or more cottonseed oil by weight and about 4% or less of another plant derived oil by weight, 97% or more cottonseed oil by weight and about 3% or less of another plant derived oil by weight, 98% or more cottonseed oil by weight and about 2% or less of another plant derived oil by weight, or 99% or more cottonseed oil by weight and about 1% or less of another plant derived oil by weight.

In some cooking compositions of the disclosure, the oil comprises about 70% cottonseed oil by weight and about 30% of another plant derived oil by weight, 71% cottonseed oil by weight and about 29% of another plant derived oil by weight, 72% cottonseed oil by weight and about 28% or less of another plant derived oil by weight, 73% cottonseed oil by weight and about 27% of another plant derived oil by weight, 74% cottonseed oil by weight and about 26% of another plant derived oil by weight, 75% cottonseed oil by weight and about 25% of another plant derived oil by weight, 76% cottonseed oil by weight and about 24% of another plant derived oil by weight, 77% cottonseed oil by weight and about 23% of another plant derived oil by weight, 78% cottonseed oil by weight and about 22% of another plant derived oil by weight, 79% cottonseed oil by weight and about 21% of another plant derived oil by weight, 80% cottonseed oil by weight and about 20% of another plant derived oil by weight, 81% cottonseed oil by weight and about 19% of another plant derived oil by weight, 82% cottonseed oil by weight and about 18% of another plant derived oil by weight, 83% cottonseed oil by weight and about 17% of another plant derived oil by weight, 84% cottonseed oil by weight and about 16% of another plant derived oil by weight, 85% cottonseed oil by weight and about 15% of another plant derived oil by weight, 86% cottonseed oil by weight and about 14% of another plant derived oil by weight, 87% cottonseed oil by weight and about 13% of another plant derived oil by weight, 88% cottonseed oil by weight and about 12% of another plant derived oil by weight, 89% cottonseed oil by weight and about 11% of another plant derived oil by weight, 90% cottonseed oil by weight and about 10% of another plant derived oil by weight, 91% cottonseed oil by weight and about 9% of another plant derived oil by weight, 92% cottonseed oil by weight and about 8% of another plant derived oil by weight, 93% cottonseed oil by weight and about 7% of another plant derived oil by weight, 94% cottonseed oil by weight and about 6% of another plant derived oil by weight, 95% cottonseed oil by weight and about 5% of another plant derived oil by weight, 96% cottonseed oil by weight and about 4% of another plant derived oil by weight, 97% cottonseed oil by weight and about 3% of another plant derived oil by weight, 98% cottonseed oil by weight and about 2% of another plant derived oil by weight, or 99% cottonseed oil by weight and about 1% of another plant derived oil by weight.

Cooking composition 102 may be made from a blend of oils containing linoleic acid and saturated fatty acids. The linoleic acid can be derived from cotton seed oil, grape seed oil, corn oil, canola oil, safflower oil, palm oil, olive oil, sunflower oil, or soybean oil. The blend of linoleic acid and saturated fatty acids may vary to provide a cooking composition 102 that has desirable cooking characteristics as described herein. The cooking composition may contain a blend of linoleic acid ranging from about 40% to about 60% of the cooking composition by weight, and a blend of saturated fatty acids ranging from about 15% to about 40% of the cooking composition by weight. The cooking composition 102 may be formulated to reduce the presence of trans fatty acids in the cooking composition 102. The cooking composition 102 may contain less than about 1% trans fatty acids by weight. In some cooking compositions of the disclosure, cooking composition 102 comprises about 40% to about 60% linoleic acid by weight, about 15% to about 40% saturated fatty acid by weight, and about 1% or less trans fatty acid by weight. In some cooking compositions of the disclosure, linoleic acid and saturated fat acid comprises at least 80% by weight of cooking composition 102. In some cooking compositions of the disclosure, cooking composition 102 comprises a fatty acid profile of about 1.0% myristic acid by weight, about 22% palmitic acid by weight, about 3.0% stearic acid by weight, about 19% oleic acid by weight, about 54% linoleic acid by weight, and about 1% linolenic acid by weight.

The crystal inhibitor can be any crystal inhibitor suitable for use in food products that inhibits formation of crystals in cottonseed oil. Preferably the crystal inhibitor comprises a polyglyceride based crystal inhibitor. Examples of polyglyceride based inhibitors include, but are not limited, to polyglycerides, polyglycerol esters and the like. Examples of polyglycerol esters include, but are not limited to, CAPROL® 3GO, CAPROL® 3GVS, CAPROL® 6G2O, CAPROL® 0G4O, CAPROL® 10G100. CAPROL® ET, CAPROL® Microexpress I, II or III, CAPROL® MPGO, and CAPROL® PGE 860 (Abitec, Columbus, Ohio).

The amount of crystal inhibitor in cooking composition 102 can be varied to provide a cooking composition 102 with desirable cooking and performance, including low rates of oil polymerization at medium and high cooking temperatures, reduced browning at medium and high cooking temperatures, desirable flavor, desirable lubricant properties and the like. The crystal inhibitor comprises about 0.1% to about 1% by weight of the oil. In some of the cooking compositions of the disclosure, the crystal inhibitor comprises about 0.1% to about 0.7%, about 0.2% to about 0.7%, about 0.3% to about 0.7%, about 0.4% to about 0.7%, about 0.5% to about 0.7%, or about 0.6% to about 0.7% by weight of the oil. In some of the cooking compositions of the disclosure, the crystal inhibitor comprises about 0.1% to about 0.6%, about 0.2% to about 0.6%, about 0.3% to about 0.6%, about 0.4% to about 0.6%, or about 0.5% to about 0.6% by weight of the oil. In some of the cooking compositions of the disclosure, the crystal inhibitor comprises about 0.1% to about 0.5%, about 0.2% to about 0.5%, about 0.3% to about 0.5%, or about 0.4% to about 0.5% by weight of the oil. In some of the cooking compositions of the disclosure, the crystal inhibitor comprises about 0.1% to about 0.4%, about 0.2% to about 0.4%, or about 0.3% to about 0.4% by weight of the oil. In some of the cooking compositions of the disclosure, the crystal inhibitor comprises about 0.1%, about 0.2%, about 0.3%, about 0.4%, about 0.5%, about 0.6%, about 0.7%, about 0.8%, about 0.9%, or about 1% by weight of the oil. In some of the compositions of the disclosure, the crystal inhibitor comprises 0.3% or less by weight of the oil.

Various cookware release agents can also be utilized in the cooking compositions of the disclosure. Exemplary cookware release agents include but are not limited to phospholipids, such as phosphorus-containing glycerides, including lecithin, lyso-phospholipids, phosphated monoglycerides, phosphated diglycerides, and mixtures thereof. Preferably, the cookware release agent includes phosphated monoglyceride, phosphated diglyceride, or a combination thereof. Examples of phosphated monoglyceride and phosphated diglyceride include, but are not limited to, Lamchem PE130, Lamchem PE130K (Lambent Tech. Corp., Gurnee, Ill.), GPC-10-CSO-LA, GPS-10-HVO, and GPC-10-LA (Magrabar Chem. Corp., Morton Grove, Ill.).

The cookware release agent comprises about 0.5% to about 10%, about 0.5% to about 9.5%, about 0.5% to about 9%, about 0.5% to about 8.5%, about 0.5% to about 8%, about 0.5% to about 7.5%, about 0.5% to about 7%, about 0.5% to about 6.5%, about 0.5% to about 6%, about 0.5% to about 5.5%, about 0.5% to about 5%, about 0.5% to about 4.5%, about 0.5% to about 4%, about 0.5% to about 3.5%, about 0.5% to about 3%, about 0.5% to about 2.5%, about 0.5% to about 2%, about 0.5% to about 1.5%, or about 0.5% to about 1% by weight of cooking composition 102.

In some of the cooking compositions of the disclosure, the cookware release agent comprises about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, or about 10% by weight of cooking composition 102. In some of the cooking compositions of the disclosure, the cookware release agent comprises about 0.5% to about 7%, about 1% to about 7%, about 1.5% to about 7%, about 2% to about 7%, about 2.5% to about 7%, about 3%, to about 7%, about 3.5% to about 7%, about 4% to about 7%, about 4.5% to about 7%, about 5% to about 7%, about 5.5% to about 7%, about 6% to about 7%, or about 6.5% to about 7% by weight of cooking composition 102. In some of the cooking compositions of the disclosure, the cookware release agent comprises about 0.5% to about 6%, about 1% to about 6%, about 1.5% to about 6%, about 2% to about 6%, about 2.5% to about 6%, about 3%, to about 6%, about 3.5% to about 6%, about 4% to about 6%, about 4.5% to about 6%, about 5% to about 6%, or about 5.5% to about 6% by weight of cooking composition 102. In some of the cooking compositions of the disclosure, the cookware release agent comprises about 0.5% to about 5%, about 1% to about 5%, about 1.5% to about 5%, about 2% to about 5%, about 2.5% to about 5%, about 3%, to about 5%, about 3.5% to about 5%, about 4% to about 5%, or about 4.5% to about 5% by weight of cooking composition 102. In some of the cooking compositions of the disclosure, the cookware release agent comprises about 0.5% to about 4%, about 1% to about 4%, about 1.5% to about 4%, about 2% to about 4%, about 2.5% to about 4%, about 3%, to about 4%, or about 3.5% to about 4% by weight of cooking composition 102.

The cooking composition 102 can optionally include one or more preservatives, flavorings, foam inhibitors, colorants, and/or water. One or more preservatives may be included in the compositions. The one or more preservatives are preferably FDA approved for food products. The preservative is preferably an antioxidant. Examples of suitable preservatives include, but are not limited to, propyl gallate, butylated hydroxyanisole, tertiary butylhydroxyquinone, tocopherol, and plant extracts comprising one or more natural antioxidants. Typically, the one or more preservatives comprises about 0.01% to about 0.1% by weight of the composition.

If a particular color is desired for the cooking composition 102, one or more colorants may be added. Preferably the colorants are FDA approved for food products. Examples of suitable colorants include, but are not limited to, annatto and beta-carotene. Typically, a small quantity of the colorants is required, with a range of about 5 to about 10 parts per million being sufficient.

If a particular flavor is desired for the cooking composition 102, one or more flavorings may be added. Preferably the flavorings are concentrated. The flavorings may be in liquid form or dry form. Examples of flavorings include, but are not limited to, butter flavor, garlic flavor, smoke flavor including but not limited to mesquite flavor and hickory flavor, and Italian herb flavor. Typically, the one or more flavorings comprises about 0.01% to about 2% by weight of the composition.

The cooking composition 102 can have analytical properties relating to peroxide value, iron content, linolenic acid content, and/or free fatty acid content. In some of the cooking compositions, the compositions comprise a peroxide value of 1.0 or less, a presence of 1.0 parts per million of iron, less than 1.0% linolenic acid by weight of the cooking composition, and less than 0.10% free fatty acids by weight of the cooking composition. The analytical properties of the cooking composition 102 may vary depending on the formulation of the cooking composition 102.

A quantity of water may be present in the cooking composition 102. A quantity of water may help eliminate or reduce foaming when the cooking composition 102 is applied and may be varied to provide a cooking composition with desirable cooking characteristics. Cooking composition 102 comprises about 0% to about 5% water by weight. In some cooking compositions of the disclosure, cooking composition 102 comprises about 0% to about 4%, about 0% to about 3.5%, about 0% to about 3%, about 0% to about 2.5%, about 0% to about 2%, about 0% to about 1.5%, about 0% to about 1%, or about 0% to about 0.5% water by weight. In some cooking compositions of the disclosure, cooking composition 102 comprises about 0%, about 0.1%, about 0.2%, about 0.3%, about 0.4%, about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, about 2%, about 2.1%, about 2.2%, about 2.3%, about 2.4%, about 2.5%, about 2.6%, about 2.7%, about 2.8%, about 2.9%, about 3%, about 3.1%, about 3.2%, about 3.3%, about 3.4%, about 3.5%, about 3.6%, about 3.7%, about 3.8%, about 3.9%, about 4%, about 4.1%, about 4.2%, about 4.3%, about 4.4%, about 4.5%, about 4.6%, about 4.7%, about 4.8%, about 4.9%, or about 5% water by weight. The quantity of water in the cooking composition is preferably less than 1.0% by weight of the cooking composition 102.

Referring now to FIG. 1 and FIG. 2, the application of a cooking spray to a skillet 100 and grilling surface 208 is shown. The cooking composition 102 may be sprayable and packaged in a spraying apparatus 104. The spraying apparatus 104 may be an aerosol spray container. The cooking composition 102 may be mixed with a mixture of liquefied hydrocarbon gases, ambient air, nitrogen gases, helium gas, carbon dioxide gas, nitrous oxide gas, or a combination thereof that act as a propellant to propel the cooking composition 102 out of the can as aerosol spray 104. Preferably the propellant is a food grade propellant. In some of the composition of the disclosure, cooking composition 102 comprises about 8% to about 18%, about 10% to about 10%, or about 14% to about 18% propellant by weight. The aerosol spray container 104 may be used to apply the cooking composition 102 to a skillet 106. The skillet 106 may be heated by a burner 108. The skillet 106 is placed on a burner 108. The burner 108 may be set to a medium to high cooking temperature.

The cooking composition 102 can also be used in cooking processes involving low temperature or cooking processes that do not involve heat. The cooking composition 102 may also be applied using a non-aerosol spray system. The cooking composition 102 is being applied to a skillet 106, however, the cooking composition 102 may be used in various cooking techniques and may be applied to various cooking utensils. The cooking composition 102 may be used when performing various cooking techniques that involve medium to high temperatures, such as temperatures above 350° F. Examples of cooking techniques that may employ medium to high temperatures include but are not limited to frying, grilling, sauteing, and baking. The cooking composition 102 may also be applied to skillets, muffin tins, baking sheets, bowls, grills, pans and the like.

Referring now to FIG. 2 the application of a cooking composition to a grill 200 is depicted. The cooking composition 102 may be applied using an aerosol or non-aerosol spray device 204. The cooking composition 102 may be applied to a grill 206 to lubricate the grill grates 208.

Referring now to FIG. 3, a method for making a cooking composition is shown 300. The method may include the steps of offering a first quantity of plant derived oil 302. Processing the first quantity of plant derived oil 304. Offering a second quantity of a crystal inhibitor 306. Blending the first quantity of plant derived oil and the second quantity of crystal inhibitor 308. The step of offering a first quantity of plant derived oil 302 may include offering oil derived from corn, soybeans, sunflowers, safflowers, olives, canola, palm, cotton seed, grapeseed and the like. Additionally the plant derived oil may be a mixture of oil derived from multiple plant sources. A plant derive oil is contemplated to include oil derived directly from growing plant tissue as well as oil derived from seed tissue and the like.

The processing of the plant derived oil 304 may involve any processing steps necessary to yield a desirable cooking composition 102. The processing of the cotton seed oil 304 may include steps such as refining, bleaching, deodorizing and winterizing. The step of offering a second quantity of a crystal inhibitor 306 may include offering any suitable crystal inhibitor as disclosed herein. The step of blending the first quantity of plant derived oil and the second quantity of crystal inhibitor 308 is not limited to making a homogenous blend of crystal inhibitor and plant derived oil, but may be a heterogeneous mixture of plant derived oil and crystal inhibitor.

The oil or blended oil is mixed under agitation with the cookware release agent and then water, if any, is added to the composition. The composition is mixed at ambient temperature for about 30 minutes and then processed into containers. In some of the compositions of the disclosure, the cookware release agent mixed into the oil or blended oil comprises phosphated monoglyceride, phosphated diglyceride, or a combination thereof.

The following examples are provided for illustrative purposes only, and are in no way intended to limit the scope of the present application. All references in the examples to "%" or "percent" mean percent by weight as defined above.

Example 1

The non-stick performance of a cooking composition of the disclosure was compared to PAM® Grilling cooking spray with palm oil. The cooking composition of the disclosure included about 93% to about 95% cottonseed oil, about 0.2% to about 0.5% crystal inhibitor, and about 5% to about 6% cookware release agent by weight. The PAM® Grilling cooking spray included about 93% to about 95% by weight of a fully refined, double fraction, non-hydrogenated palm olein. The PAM® Grilling spray contained the same cookware release agent as the tested cooking composition of the disclosure and a foam inhibitor but did not include a crystal inhibitor. In some instances, PAM® Grilling cooking spray cans with palm oil clogged at a commercially unacceptable rate. The cooking composition of the disclosure clogged the body, stem, and/or actuator of spraying apparatus at a significantly lower rate than the PAM® Grilling palm olein formulation.

1. Sauté Procedure:

Boneless skinless chicken breasts were pounded to a similar thickness and refrigerated. Pans were sprayed with a one second spray 6 inches from the surface of the pan in a "z" pattern. Pans were preheated 2 minutes on flame level "6". Chicken was added and flame turned down to "5". Chicken was cooked for 5 minutes on each side. The front left burner of a GE Profile gas range was used. Skillets were washed in the dishwasher.

Trial 1 (CALPHALON® Skillets)

The cottonseed sample performed slightly better than palm. Chicken was cooked for 5 minutes at flame "6" and 5 minutes at flame "5" in this trial. Both samples had a small piece of chicken that stuck to the pan when flipped, neither stuck when removing from the pan. Both pans had some yellowing of the cooking spray; however the cottonseed sample had less yellowing than the palm sample. Some yellow tacky residue remained after washing in the dishwasher, however the cottonseed sample had ~50% less residue in the pan than the palm sample. The chicken prepared with the cottonseed sample browned more than the palm sample; appearance of the cottonseed chicken breast was preferred to the palm sample.

Trial 2 (CALPHALON® Skillets)

Samples were performed as described above. There was no sticking and no yellowing of the either the cottonseed sample or palm sample. Chicken breasts had similar appearance. Both pans were clean out of the dishwasher, no residue remained.

Trial 3 (ALL CLAD® Skillets)

The cottonseed sample performed slightly better than the palm sample. Oil did not brown in either sample. The chicken stuck less and had a better appearance in the cottonseed sample compared to the chicken prepared with the palm sample. Both pans were clean out of the dishwasher, no residue remained.

2. Egg Procedure:

Eggs were used from the same date code. One egg was cracked into a Styrofoam bowl as needed for testing; eggs were held in the refrigerator. The eggs were not allowed to warm to ambient temperature or to have a skin form on the egg before using. Eggs with broken yolks were discarded. Pans were at ambient temperature. Pans were washed by hand between trials. The spray cans were shaken to a count of ten prior to spraying. The pans were sprayed with a one second spray 6 inches from the surface of the pan in a "z" pattern One person did all of the spraying. The pan was placed in exactly the same place each time and heated on medium-high (6) heat for 1 minute, then heat was reduced to medium (4) and egg was poured into the pan from the Styrofoam bowl. Egg cooked undisturbed for 6 minutes and then immediately removed from heat and held with the right elbow into the 'waist to standardize drop height' and the turned perpendicular to plate (90° angle). It was noted if egg released from pan onto plate. If egg did not release right away the pan was turned to 180°.

Trial 1 (ALL CLAD®)

The cottonseed and palm samples performed equally. Eggs browned more than desired, overcooked on edges. Neither released immediately but when the overcooked edge was lifted with a spatula, eggs slid out of the pan. The pan spray with cottonseed cleaned up with slightly less effort than the pan sprayed with the palm sample.

Trial 2 (CALPHALON®)

The cottonseed and palm samples performed equally. Both eggs released at 90° and pans washed up easily by hand.

Trial 3 (CALPHALON®)

The cottonseed and palm samples performed equally. Both eggs released at 90° and pans washed up easily by hand.

3. Cornbread Procedure:

One batch of cornbread was prepared and divided by weight into 2 8×8 pans that had been sprayed with the cottonseed sample or palm sample. Both samples were baked at the same time on the middle rack of a Thermador oven. Samples were baked for 30 minutes and 375° and allowed to cool for 10 minutes before removing from the pan.

Trial 1

Neither sample released from the pan after a knife was run around the edge or after shaking the pan. A spatula was used to scoop cornbread out of the pan. Despite being baked and cooled at the same time, the pan used in the cottonseed sample was cooler than the pan holding the palm sample; this affected results. Less residue remained in the warmer pan (palm), residue clung more to the cooler pan (cottonseed). Both pans were clean out of the dishwasher.

Trial 2

The palm sample performed slightly better than the cottonseed sample. Both samples released after running a knife around the edge and shaking. Both samples had equal light residue scattered over the pan and one spot of cornbread stuck in the pan; the pan sprayed with cottonseed had a larger spot of cornbread remaining than the pan sprayed with palm. Both pans were clean out of the dishwasher.

4. Grilling Procedure:

The left half of a rectangular grill was sprayed with cottonseed sample, the right half with palm sample. After preheating, nine chicken breasts were placed on each side of the grill. Temperatures measured with an infrared thermometer ranged from 388-682° F. throughout the grilling process. The grill was hottest at the back and coolest in the front. Chicken did not stick when turned or removed from the back of the grill. Both samples showed some sticking when turning on the front third of the grill; this was due to the lower temperature and inadequate sear before turning. When chicken was removed from the grill, the left and right sides had an equal amount of chicken residue stuck to the grill grates. Chicken residue remained only on the front third of the grill. Both halves of the grill cleaned up easily with a grill brush.

The cottonseed sample performed slightly better than palm when sauteing chicken. The palm sample performed slightly better than the cottonseed sample when baking cornbread. Both samples performed equally when cooking eggs and grilling chicken.

Example 2

Figure 4:
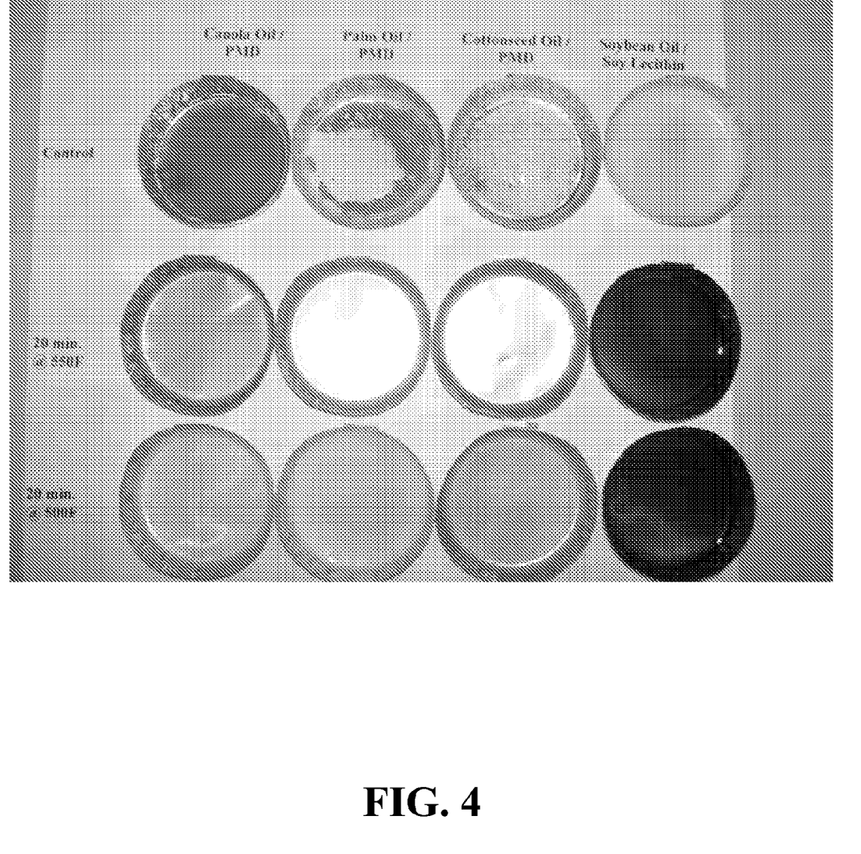
FIG. 4 shows the results of a heat performance test of four cooking spray compositions: canola oil/PMD, palm oil/PMD, cottonseed oil/PMD, and soybean oil/soy lecithin. Soybean oil/soy lecithin significantly darkened and burned at 500° F. or 550° F. for 20 minutes. Palm oil/PMD exhibited less browning than canola oil/PMD and soybean oil/soy lecithin at both temperatures. Cottonseed oil/PMD exhibited less browning than canola oil/PMD, and soybean oil/soy lecithin and less browning or equal to palm oil/PMD at both 500° F. and 550° F. for 20 minutes.

Heat performance of cooking sprays comprising canola oil and phosphated monoglyceride (PMD), palm oil and PMD, cottonseed oil and PMD, and soybean oil and soy lecithin was compared. The palm oil was fully refined, double fraction, non-hydrogenated palm olein. The cottonseed oil was winterized cottonseed oil comprising a crystal inhibitor. All the formulations contained a similar amount of oil by weight percent. The canola, palm, and cottonseed formulations contained a similar amount of PMD by weight percent. A sample was sprayed onto the cooking surface of an aluminum pan and heated on a heating element at 500° F. or 550° F. for 20 minutes. The results are shown in FIG. 4. After 20 minutes at 500° F. or 550° F., the soybean oil/soy lecithin was significantly darkened and burned compared to canola oil/PMD, palm oil/PMD, and cottonseed oil/PMD. Palm oil/PMD exhibited less browning than canola oil/PMD at both temperatures. Cottonseed oil/PMD exhibited less browning than canola oil/PMD at 500° F. and 550° F. and less browning or equal browning to palm oil/PMD at 500° F. and 550° F.

It is believed that the present application and many of its attendant advantages will be understood by the foregoing description, and it will be apparent that various changes may be made in the form, construction and arrangement of the components thereof without departing from the scope and spirit of the application without sacrificing all of its material advantages. The form herein before described being merely explanatory, it is the intention of the following claims to encompass and include such changes.

What is claimed is:

1. A sprayable cooking composition, comprising:
   an aerosol delivery device comprising a spray nozzle system;
   a cooking composition sprayable from the spray nozzle system of the aerosol delivery device, wherein the cooking composition comprises:
      at least about 70% cottonseed oil by weight of the cooking composition,
      about 0.1% to about 1% crystal inhibitor by weight of the cottonseed oil, and about 0.5% to about 10% cookware release agent by weight of the cooking composition,
wherein the cooking composition facilitates a clog rate of the spray nozzle system that is less than about 0.2% when sprayed through the spray nozzle system of the aerosol delivery device, wherein the cooking composition has a low polymerization rate when heated to a temperature between about 400° F. and 550° F.

2. The sprayable cooking composition of claim 1, wherein the cooking compositing includes another plant derived cooking oil.

3. The sprayable cooking composition of claim 1, comprising:
about 90% to about 99% cottonseed oil by weight of the cooking composition,
about 0.1% to about 0.5% crystal inhibitor by weight of the cottonseed oil,
about 0.5% to about 5% cookware release agent by weight of the cooking composition; and
about 0% to about 0.5% water by weight of the cooking composition.

4. The sprayable cooking composition of claim 1, wherein the cottonseed oil is at least one member of a group comprising: refined, winterized, and deodorized cottonseed oil.

5. The sprayable cooking composition of claim 1, wherein the crystal inhibitor comprises polyglycerol esters.

6. The sprayable cooking composition of claim 1, wherein the cookware release agent includes at least one member of a group comprising: phosphated monoglyceride, and phosphated diglyceride.

7. The sprayable cooking composition of claim 1, wherein the moisture content of the cooking composition is no more than 1.0% of the cooking composition by weight.

8. The sprayable cooking composition of claim 1, wherein the peroxide value of the cooking composition is no more than 1.0.

9. The sprayable cooking composition of claim 1, wherein the iron content of the cooking composition is less than 1.0 parts per million of iron.

10. The sprayable cooking composition of claim 1, wherein the linolenic acid content of the cooking composition is less than 1.0% of the cooking composition by weight.

11. The sprayable cooking composition of claim 1, wherein the free fatty acid content of the cooking composition is less than 0.10% of the cooking composition by weight.

12. The sprayable cooking composition of claim 1, wherein crystallization of the cooking composition occurs at about 38° F. to about 46° F.

13. The sprayable cooking composition of claim 1, wherein the cooking composition has the low polymerization rate when heated to a temperature of about 550° F. for about 20 minutes.

14. The sprayable cooking composition of claim 1, wherein the cooking composition comprises:
about 40% to about 60% linoleic acid by weight of the cooking composition;
about 15% to about 40% saturated fatty acid by weight of the cooking composition; and
about 1% or less trans fatty acid by weight of the cooking composition.

15. The sprayable cooking composition of claim 14, wherein the cooking composition comprises a fatty acid profile of about 1.0% myristic acid by weight of the cooking composition, about 22% palmitic acid by weight of the cooking composition, about 3.0% stearic acid by weight of the cooking composition, about 19% oleic acid by weight of the cooking composition, about 54% linoleic acid by weight of the cooking composition, and about 1% linolenic acid by weight of the cooking composition.

16. The sprayable cooking composition of claim 1, further comprising one or more preservatives, flavorings, and/or colorants.

17. A sprayable cooking composition, comprising:
an aerosol delivery device having a spray nozzle system;
a cooking composition sprayable from the spray nozzle system of the aerosol delivery device, wherein the cooking composition comprises:
about 78% to about 82% winterized cottonseed oil by weight of the cooking composition,
about 0.1% to about 0.5% crystal inhibitor by weight of the winterized cottonseed oil,
about 3.5% to about 4.5% cookware release agent by weight of the cooking composition,
about 0.1% to about 0.5% water by weight of the cooking composition,
about 14% to about 18% propellant by weight of the cooking composition, and
wherein the cooking composition facilitates a clog rate of the spray nozzle system that is less than about 0.2% when sprayed through the spray nozzle system of the aerosol delivery device via the propellant.

* * * * *